United States Patent
Wu

(10) Patent No.: US 8,164,695 B2
(45) Date of Patent: Apr. 24, 2012

(54) FLAT PANEL DISPLAY

(75) Inventor: Rong-Wha Wu, Yulin (TW)

(73) Assignee: Watonga Technology, Inc., Carson City, NV (US)

( * ) Notice: Subject to any disclaimer, the term of this patent is extended or adjusted under 35 U.S.C. 154(b) by 656 days.

(21) Appl. No.: 10/967,424

(22) Filed: Oct. 18, 2004

(65) Prior Publication Data
US 2005/0088066 A1     Apr. 28, 2005

(30) Foreign Application Priority Data
Oct. 22, 2003   (TW) .............................. 92129236 A

(51) Int. Cl.
*H04N 5/64*     (2006.01)
(52) U.S. Cl. ...................................... 348/836
(58) Field of Classification Search ................ 345/6, 7, 345/9; 312/223.2; 455/90; 348/831, 836
See application file for complete search history.

(56) References Cited

U.S. PATENT DOCUMENTS

| | | | |
|---|---|---|---|
| 5,719,709 A * | 2/1998 | Kodaka | 359/694 |
| 5,768,163 A * | 6/1998 | Smith, II | 708/105 |
| 6,209,846 B1 * | 4/2001 | Barlow | 361/679 |
| 6,474,823 B1 * | 11/2002 | Agata et al. | 362/26 |
| 6,542,721 B2 * | 4/2003 | Boesen | 455/553.1 |
| 6,571,086 B1 * | 5/2003 | Uusimaki | 455/90.3 |
| 6,806,850 B2 * | 10/2004 | Chen | 345/7 |
| 6,865,075 B2 * | 3/2005 | Oakley | 361/679.1 |
| 2001/0030850 A1 * | 10/2001 | Ditzik | 361/683 |
| 2003/0052856 A1 * | 3/2003 | Nakamura | 345/110 |

FOREIGN PATENT DOCUMENTS
CN           2378759         5/2000
* cited by examiner

*Primary Examiner* — Quan-Zhen Wang
*Assistant Examiner* — Calvin C Ma
(74) *Attorney, Agent, or Firm* — David R. Stevens; Stevens Law Group

(57) ABSTRACT

A flat panel display. The flat panel display comprises a main body, a control pad and a hinge. The control pad is connected to the main body by a hinge, wherein the control pad rotates on the hinge between a first position and a second position.

16 Claims, 5 Drawing Sheets

20

FLAT PANEL DISPLAY

BACKGROUND OF THE INVENTION

1. Field of the Invention

The present invention relates in general to a flat panel display, and more particularly, to a flat panel display providing a rotatable control pad.

2. Description of the Related Art

A conventional flat panel display typically provides several control buttons located on the housing thereof. As shown in FIG. 1, the conventional flat panel display 10 has a main body 101, a base 105 and a panel 102. The control buttons 103 and an indicator 104 are disposed below the panel 102. The indicator 104 provides display state information, and the display settings are modified via the control buttons 103.

To make the flat panel display lighter, thinner and more compact, the width of the border of the main body 101 must be minimized.

SUMMARY OF THE INVENTION

Accordingly, an object of the present invention is to provide a flat panel display having a rotatable control pad. The flat panel display comprises a main body, a control pad and a hinge. The control pad is connected to the main body by a hinge, wherein the control pad rotates on the hinge between a first position and a second position.

DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

First Embodiment

Figure 1:
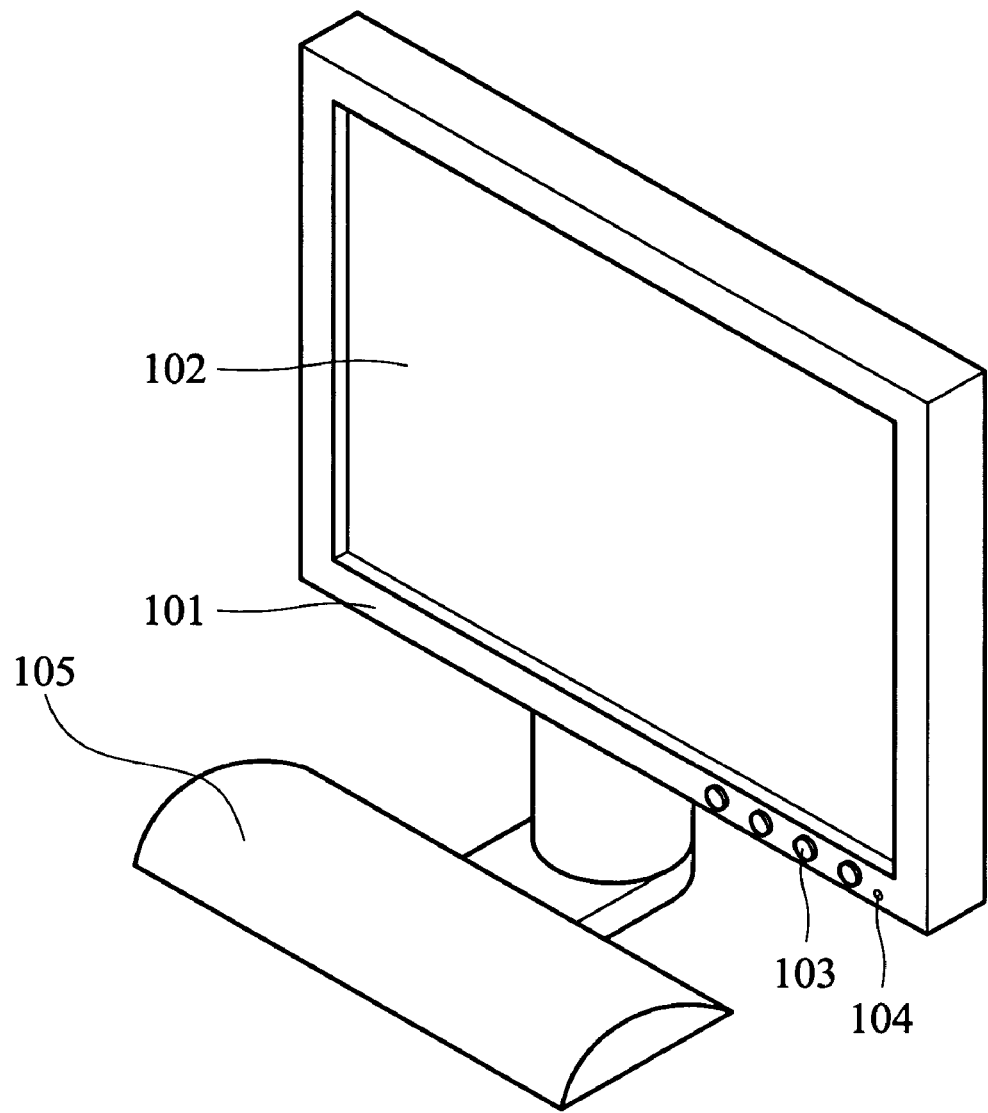
FIG. 1 is a perspective diagram of a conventional flat panel display.
Figure 2A:
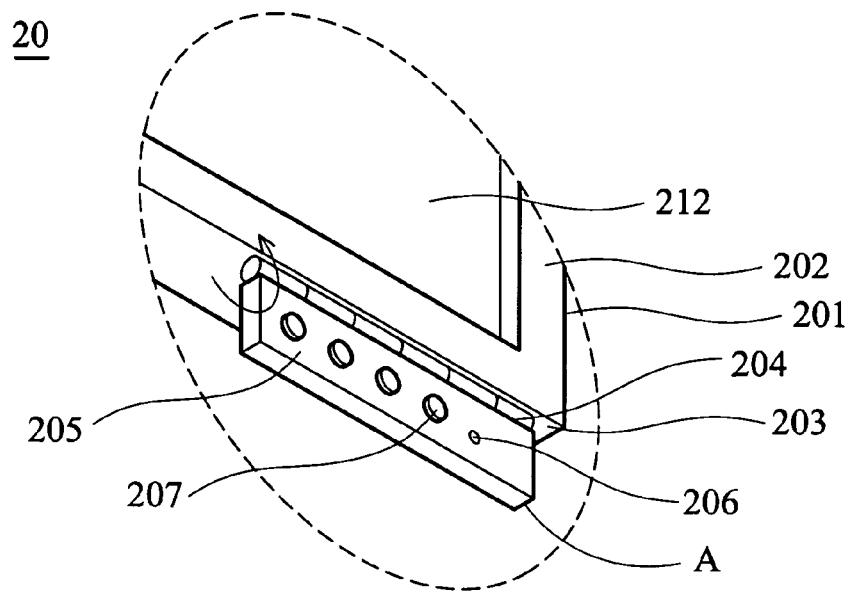
FIG. 2a is a perspective diagram of the control pad in accordance with the first embodiment of the present invention.

An object of the present invention is to provide a flat panel display having a rotatable control pad. Referring to FIG. 2a, the flat panel display comprises a main body 201, a hinge 204 and a control pad 205. The main body 201 has four lateral surfaces 203 surrounding the display surface 202 and a panel 212 thereon.

As shown in FIG. 2a, the hinge 204 is disposed on the lateral surface 203 adjacent to the edge of the display surface 202, wherein the lateral surface 203 is underneath and perpendicular to the display surface 202. The hinge 204, however, can be disposed on the other lateral surfaces. Thus, the control pad 205 is joined to the main body 201 and electrically connected by the hinge 204 such that the control pad 205 is rotatable on the hinge 204 between a first position A and a second position B as shown in FIGS. 2a and 2b.

In FIG. 2a, when the control pad 205 is in the first position A, it is parallel to the display panel 202 and perpendicular to the lateral surface 203. The control pad 205 is provided with an LED indicator 206 and several buttons 207 thereon for modifying display settings. Moreover, the control pad 205 is used by turning it to the first position A.

Figure 2B:
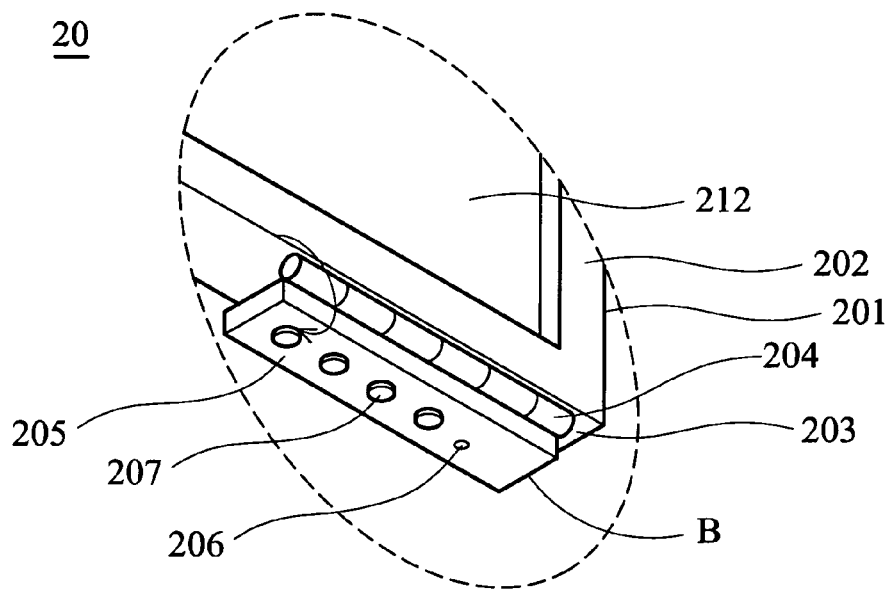
FIG. 2b is a perspective diagram of the control pad in a folded position according to the first embodiment of the present invention.

To return the control pad 205 to its original position as shown in FIG. 2b, the control pad 205 is rotated on the hinge 204 to the second position B. Thus, the control pad 205 is hidden. Specially, in FIG. 2b, when the control pad 205 is rotated to the second position B, it is parallel to the lateral surface 203 and perpendicular to the display panel 202.

Figure 2C:
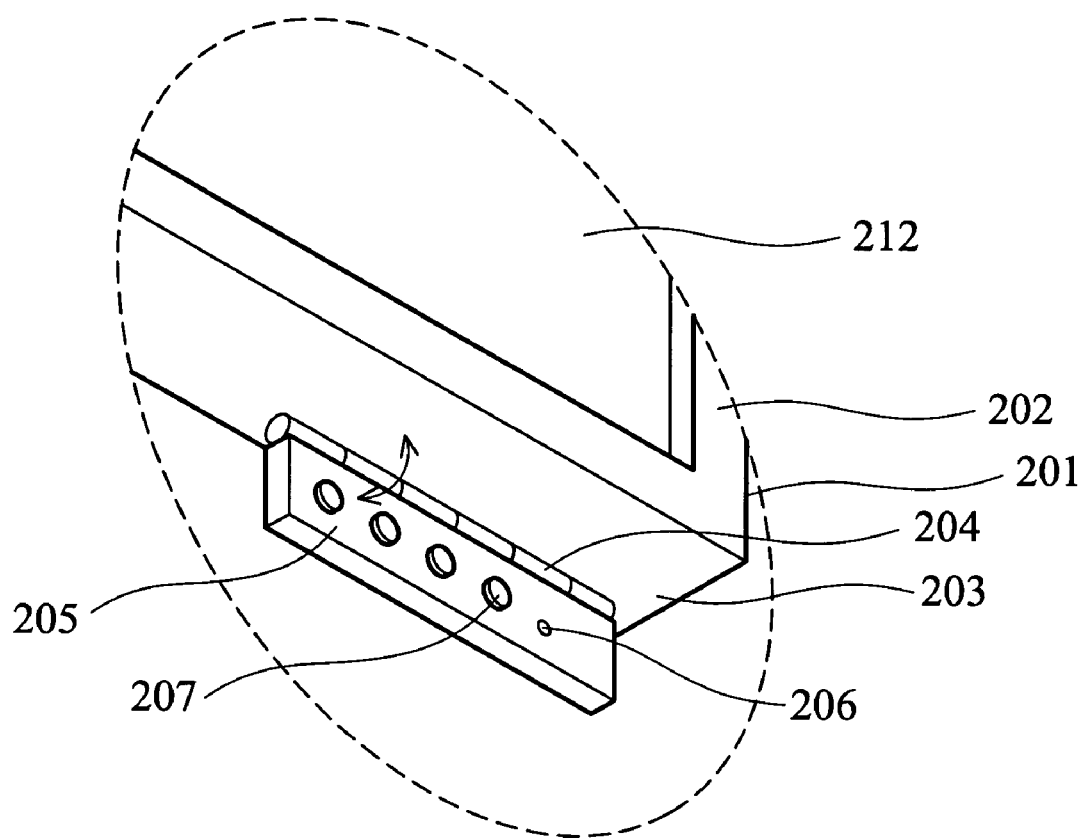
FIG. 2c is a perspective diagram of the hinge disposed on the lateral surface apart from the edge of the display surface.

The hinge 204, however, can also be disposed on a different position of the lateral surface 203. As shown in FIG. 2c, the hinge 204 is disposed on the lateral surface 203 apart from the edge of the display surface 202, and the control pad 205 is rotatable on the hinge 204 between a first position (perpendicular to the lateral surface 203) and a second position (parallel to the lateral surface 203).

Figure 3:
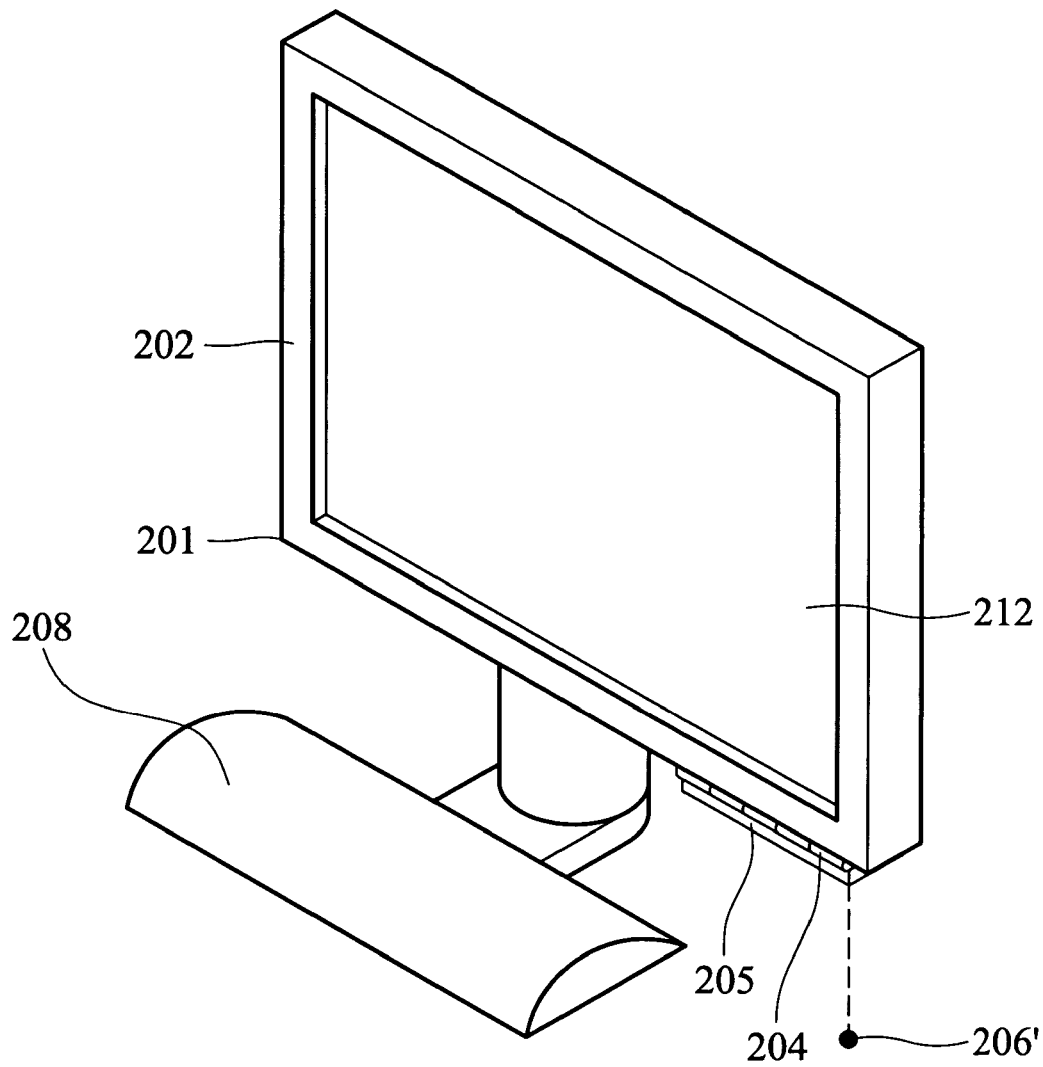
FIG. 3 is a perspective diagram illustrating the reflection of the indicator light on a surface.

Referring to FIG. 3, when the control pad 205 is in the second position B, light 206' from the indicator 206 can be reflected by a surface such as a table. The control pad 205 can be used to modify display settings even in the folded position. Moreover, the indicator 206 has a first luminance in the first position A and a second luminance in the second position B, wherein the first luminance is greater than the second luminance. That is, light 206' from the indicator 206 is brighter when the control pad 205 faces down toward the reflective surface. Hence, reflected light is noticeable and the display settings can be modified via the control pad 205.

The indicator 206, however, can also project light 206' on the base 208. To make the light 206' more clear, the base 208 has a smooth surface, such as a mirror polished surface. Thus, the light 206' is easily detectable on the smooth surface. Moreover, the flat panel display 20 is provided with a sensor therein (not shown) to determine the posture of the control pad 205. When the control pad 205 is folded as shown in FIG. 3, the indicator 206 is driven by greater driving current to provide higher luminance. Thus, the indicator 206 light is always detectable regardless of whether the control pad 205 is in the first position A or second position B.

Second Embodiment

Figure 4:
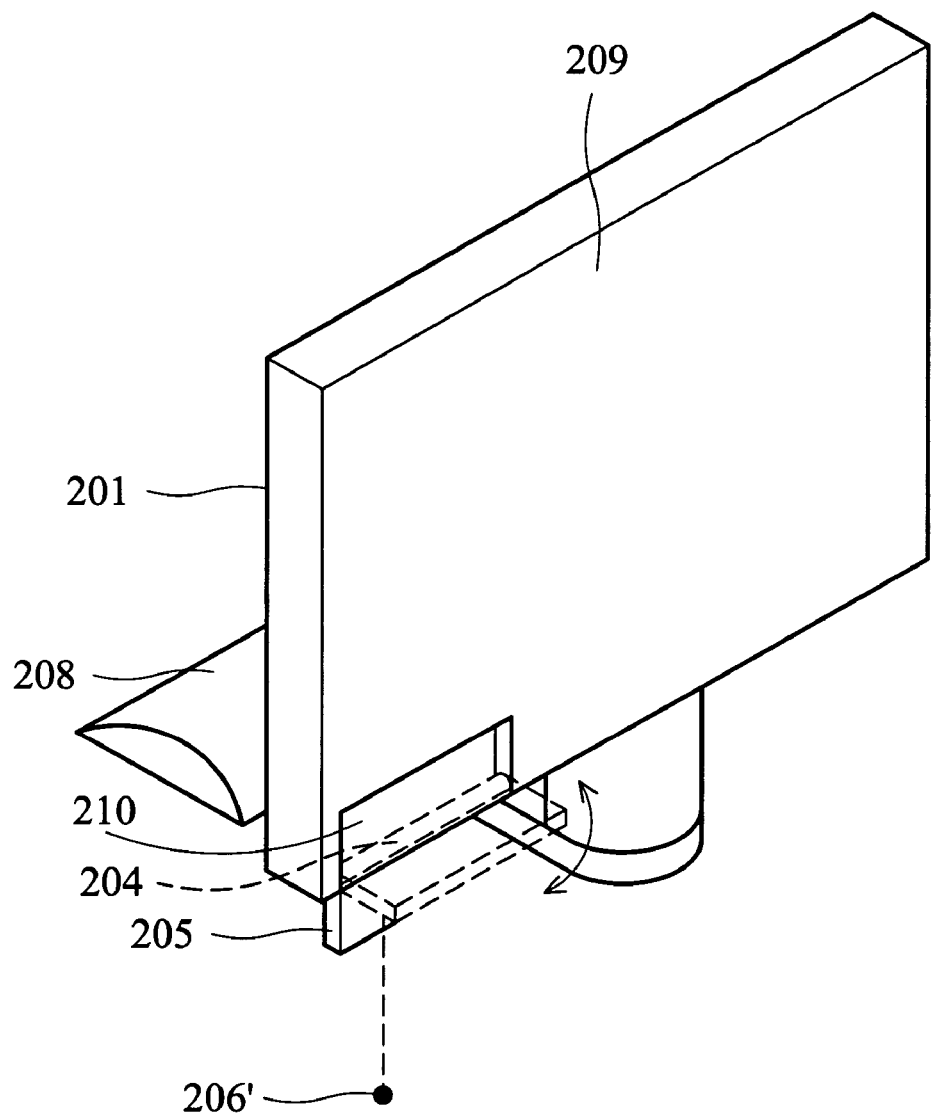
FIG. 4 is a perspective diagram in accordance with the second embodiment of the present invention.

FIG. 4 shows that the hinge 204 can also be disposed on the rear surface 209 of the flat panel display 20, wherein the rear surface 209 is parallel to the display surface 202. In FIG. 4, the control pad 205 is joined to the main body 201 and electrically connected by the hinge 204 such that the control pad 205 is rotatable on the hinge 204 between a first position and a second position as shown by the dashed line in FIG. 4. When the control pad 205 is in the first position, it is parallel to the rear surface 209 and the display panel 202. When the control pad 205 is in the second position, however, it is perpendicular to the rear surface 209 and the display panel 202. Moreover, the control pad 205 can further rotate upward to a position parallel to the rear surface 209 and be located in the recess 210.

An LED indicator 206 is disposed on the control pad 205 and projects a light 206' onto a reflective surface such as a table. When the control pad 205 faces downward, the light 206' projected by the indicator 206 is brighter and easier to notice. Additionally, display settings can be modified via the control pad 205. In summary, the present invention provides a flat panel display with a rotatable control pad 205. The control pad 205 can be conveniently folded and enables modification of display settings.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A stand-alone flat panel display, comprising:
   a main body consisting of a housing, a display surface, and a control panel thereon;
   a supporting base stand attached to the main body;
   an adjunct display-adjusting control panel unitized with the main body and including a support and a user interface for modifying display settings independently of image content; and
   a hinge connecting the control panel to the main body, wherein the control panel is rotatable by the hinge between a first position and a second position, wherein the control panel does not cover any part of the display surface in the first position and the second position.

2. The flat panel display as claimed in claim 1, wherein the main body housing has a lateral surface perpendicular to the display surface, wherein the hinge is disposed on the lateral surface and connected to the main body and the control panel.

3. The flat panel display as claimed in claim 2, wherein the control panel is perpendicular to the lateral surface in the first position and parallel to the lateral surface in the second position.

4. The flat panel display as claimed in claim 1, wherein the main body housing has a rear surface parallel to the display surface, and the hinge is disposed on the rear surface and connected to the main body and the control panel.

5. The flat panel display as claimed in claim 4, wherein the control panel is parallel to the rear surface in the first position and perpendicular to the rear surface in the second position.

6. The flat panel display as claimed in claim 1, wherein the control panel user interface has an indicator disposed thereon.

7. The flat panel display as claimed in claim 6, wherein the indicator is an LED.

8. The flat panel display as claimed in claim 6, wherein the indicator projects a light onto a mirror polished reflective surface attached to said flat panel display when said indicator is in the second position, and wherein a user of said flat panel display can determine the status of said indicator by observing the reflection of said indicator in said mirror polished reflective surface.

9. The flat panel display as claimed in claim 1, wherein the control panel has an indicator disposed thereon, and the indicator emits a first luminance in the first position and a second luminance in the second position, wherein the first luminance is lower than the second luminance, and wherein said indicator is exposed to the outside world in both said first position and said second position.

10. The flat panel display of claim 9, wherein the indicator is driven by a greater driving current when the control panel is in the second position.

11. The flat panel display as claimed in claim 1 further comprising an indicator on said user interface of said control panel, wherein the indicator projects a light onto a reflective surface in the second position, and a base that supports said housing;
    wherein said base does not contain a display panel.

12. The flat panel display as claimed in claim 11, wherein the base has a mirror polished surface and wherein a user of said flat panel display can determine the status of said indicator by observing the reflection of said indicator in said mirror polished reflective surface of said base.

13. The flat panel display as claimed in claim 1, wherein the control panel user interface has at least a button disposed thereon.

14. The flat panel display of claim 1, in which said control panel user interface consists of elements selected from the group consisting of display status indicators and display control buttons.

15. The flat panel display of claim 14, in which the display status indicators are LED indicators.

16. A stand-alone flat panel display, comprising:
    a main body consisting of a housing, a display surface, and a panel thereon;
    an adjunct display-adjusting control panel unitized with the main body and including a support and elements selected from the group consisting of display status indicators and display control buttons, for modifying display settings independently of image content;
    a supporting base stand attached to the main body; and
    a hinge connecting the control panel to the main body, wherein the control panel is rotatable by the hinge between a first position and a second position;
    wherein at least some of the display status indicators and control buttons are accessible by a user in either of said first position or said second position, and the control panel does not cover any part of the display surface in the first position and the second position.

* * * * *